3,308,202
BORON PHOSPHATE CATALYSTS AND PROCESS FOR PREPARING THE SAID CATALYSTS

Arnaud Marie José de Gramont, Gonfreville-l'Orcher, Joseph Edouard Weisang, Le Havre, and Jean Maurin, Gainneville, France, assignors to Compagnie Francaise de Raffinage, Paris, France
No Drawing. Filed Sept. 25, 1963, Ser. No. 311,294
Claims priority, application France, Sept. 27, 1962, 910,662, Patent 1,344,333
17 Claims. (Cl. 260—681)

The catalytic activity of boron phosphate has been recognised by many works relating more particularly to the dehydration reactions of aliphatic alcohols or the decomposition reactions of dimethyldioxane, with formation of isoprene.

Boron phosphate is usually prepared by the action of boric acid on phosphoric acid either in concentrated form or in a dilute solution. Some writers react equimolecular quantities of phosphoric acid and boric acid in accordance with the equation:

$$H_3PO_4 + H_3BO_3 \rightarrow PO_4B + 3H_2O$$

Other writers specify a slight and possibly even a very considerable excess of phosphoric acid, for instance, 1.5 mol of $H_3PO_4$ per 1 mol of $H_3BO_3$. Whatever form of preparation is used, boron phosphate, after reaction and possibly evaporation of the dissolving water, is separated from the reagents and from the reaction water and is calcinated at temperatures varying, with different writers, from 300 to 600° C.

Work carried out by the applicants has shown that the catalysts thus prepared have activities and physico-chemical characteristics which are variable and difficultly reproducible. More particularly, our work has shown that boron phosphate as prepared by any of the known processes is not neutral as might be assumed from the formula $PO_4B$ but has an acidity with which the entire activity of the catalyst is associated, as will be apparent from the following example in which the activity is expressed in a decomposition reaction of 4,4 dimethylmetadioxane as mol of isoprene formed per 100 mol of dioxane used.

| Number of mols of Phosphoric acid | Number of mols of Boric acid | Calcining Temperature, ° C. | Milliequivalent activity/g. | Activity |
|---|---|---|---|---|
| 1 | 1 | 400 | 0.16 | 58 |
| 1 | 1 | 600 | 0.02 | 13 |
| 1.5 | 1 | 650 | 0.12 | 50 |
| 1.5 | 1 | 400 | 3.8 | 43 |

This acidity is likely to vary within very wide limits with the form of preparation used; it is also found that not even any one given manufacturing process can provide a product having constant and reproducible characteristics.

This invention relates to a process for the preparation of boron phosphate catalysts which enables the final acidity of the catalytic composition to be strictly controlled and adjusted to the optimum values for the particular use for which the catalyst is intended.

In a first phase, boron phosphate is prepared by direct action of phosphoric acid on boric acid by any known means, and a composition is produced which, after drying at from 100 to 150° C., is finally calcined at a temperature of from 550 to 800° C., preferably at around 600–650° C. The resulting boron phosphate catalyst has a measurable acidity which may vary from one batch to another, and this acidity is substantially always less than the acidity required for optimum catalytic activity. This is the acidity to be controlled.

In a second phase, the calcined composition prepared in the first phase is acidified to the desired value by means of a controlled quantity of an acid. This treatment is performed, for instance, by the calcinated composition yielded by the first phase of operations being mixed with a controlled quantity of phosphoric acid in aqueous solution, followed by evaporation until dry and drying at a temperature of about 400° C. or less, preferably below 200° C. As a variant, the phosphoric acid can be added in solution in ether.

The boron phosphate can be acidified by other acids of the phosphoric series, such as pyrophosphoric acid, as well as by ordinary phosphoric acid. Our work has shown that other strong acids with no or low volatility, such as sulphuric acid, sulphonic acids such as benzenosulphonic acid, arsenic acid, and so on can also be used for this step. Acidification to a controlled value by the acids just specified can be performed on a calcined product which is preferably pelleted or extruded to be brought to the required shapes and sizes for filling the catalyst vessels.

Another procedure falling under this invention is to dip the calcined composition into an aqueous or etheric solution of an acid, then to centrifuge and dry the composition in a stream of air or nitrogen. The quantity of acid fixed is then proportional to the concentration of the solution used.

The following non-limitative examples describe various procedures for the preparation of boron phosphate catalysts which are accurately adjusted to various acidity levels by means of the invention.

Example 1

A solution of 1 kg. of boric acid in 3.8 kg. of boiling water is mixed with 3.16 kg. of an aqueous 50% by weight solution of orthophosphoric acid. The mixture is heated to 100° C. and the water is evaporated by agitation until a pasty product is yielded. After drying and crushing, the powder (1.7 kg.) is homogenized, then worked up into paste with a reduced amount of water until its consistency is suitable for extrusion, whereafter it is processed by being passed through an extruder into cylinders 2 mm. in diameter and 4 mm. in length. The product is dried at 150° C. for 3 hours, then calcined at 600° C. in a muffle furnace for 15 hours. After these various steps and after cooling, 1.610 kg. of sticks of a commercial hardness are yielded. Acidity is measured by the Johnson method, the indicator used being 4-phenylazonaphthylamine of pK+4.0, to provide a complete dosage of the first acidity of $H_3PO_3$. It is found that the product has an acidity of 0.06 milliequivalent per gram.

The sticks are dipped in 1.6 kg. of an aqueous 12% by weight solution of orthophosphoric acid for 5 minutes, then drained, then centrifuged in an air stream until their weight is 1.860 kg. The composition is dried at 150° C. for 3 hours, and 1.640 kg. of product whose dosed acidity is 0.25 milliequivalent/g. are yielded.

Example 2

To a boiling solution of 1 kg. of boric acid in 4.0 kg. of water are added 2.047 kg. of 85% orthophosphoric acid—i.e., an excess of 10% above a theoretical value corresponding to the formula $PO_4B$. After evaporation until drying, a dry composition is yielded which is crushed, homogenized, pelleted into cylinders 3 mm. in diameter and 3 mm. long, then calcined at 625° C. for 15 hours. The acidity of this composition is 0.05 milliequivalent per gram of acid. 1.5 kg. of the product stock are taken and are wetted with 22.5 g. of orthophosphoric acid in solution in ethyl ether. After progressive drying as far as 200° C., a catalyst is yielded whose controlled acidity is 0.20 milliequivalent/g.

Example 3

1.86 kg. of 85% orthophosphoric acid are added to a boiling solution of 1 kg. of boric acid in 3.8 kg. of water. After evaporation, drying at 150° C. and extrusion, the composition is calcined at 650° C. for 15 hours. 1 kg. of the resulting product is taken, with acidity contents of 0.04 milliequivalent/g., and is wetted with 11.75 g. of an aqueous 85% orthophosphoric acid solution. The water is evaporated in a water bath and the product heated to 150° C.; a catalyst whose acidity is 0.15 milliequivalent is produced.

The noteworthy result provided by the invention—i.e., the ability to arbitrarily adjust the acidity of the catalyst and to adapt such acidity to the best values for the particular reactions concerned—has considerable practical usefulness, as is shown by the following example wherein the boron phosphate catalyst is used for the manufacture of isoprene by decomposition of 4,4 dimethylmetadioxane.

A number of catalysts whose acidities have a spread of from 0.02 to 1.8 milliequivalent/g are prepared in accordance with this invention. Each such catalyst is used in a catalytic furnace supplied, at 200° C. and at atmospheric pressure, with 0.044 litre of 4,4 dimethylmetadioxane and 0.220 litre of water per litre of catalyst and per hour. The following table compares the activities of these catalysts by comparing their yield of isoprene, the yield of isobutylene as by-product, and plugging of the catalyst by carbon.

| No. | Phosphoric acid deposited, percent by weight | Dosed acidity, milliequivalents/g. | Mols of isoprene formed per 100 mols of dioxane used | Mols of isobutylene formed per 100 mols of isoprene formed | Percent weight carbon on catalyst |
|---|---|---|---|---|---|
| 1 | 0 | 0.02 | 9.7 | 30.3 | |
| 2 | 0.4 | 0.034 | 49.2 | 13.4 | 0.44 |
| 3 | 1.0 | 0.11 | 76.6 | 10.0 | 0.79 |
| 4 | 1.5 | 0.15 | 75.8 | 8.3 | 0.89 |
| 5 | 2.5 | 0.24 | 85.9 | 6.2 | 1.73 |
| 6 | 5.0 | 0.48 | 60.2 | 6.2 | 2.78 |
| 7 | 20.0 | 1.80 | 43.1 | 5.1 | 2.76 |

These experiments show mainly the activity of the catalysts prepared by the process according to the invention, and also show the usefulness of a controlled acidity for optimum adjustment of catalytic efficiencies. Specifically, boron phosphate catalysts acidify to from 0.05 to 0.5 milliequivalent/g., preferably 0.10 to 0.25 milliequivalent/g. of orthophosphoric acid to provide the best yields of isoprene; less acid catalysts lead to an increased production of isobutylene, while more acid catalysts produce considerable cracking.

The following examples show how acids other than phosphoric acid can be used to provide a controlled acidity of boron phosphate catalyst.

Example 4

A boron phosphate catalyst prepared by the action of boric acid and orthophosphoric acid in the same conditions as set forth in Example 1 is impregnated with an aqueous solution of dilute sulphuric acid so that the catalyst contains 0.5% by weight of pure sulphuric acid. The final acidity measured by the Johnson method is 0.135 milliequivalent/g. It is found that the catalyst, tested in the same conditions as the catalysts listed in the foregoing table for the formation of isoprene by decomposition of dimethylmetadioxane, produces 55.2 mol of isoprene per 100 mol of dioxane treated, and 12.6 mol of isobutylene per 100 mol of isoprene formed. This production is stable in time.

A different catalyst impregnated with greater sulphuric acid contents and having an acidity of 0.33 meq./g. lost its activity rapidly—as might be expected from the table—because of plugging by carbon.

Example 5

A boron phosphate catalyst prepared by the action of boric acid and orthophosphoric acid in the same conditions as set forth in Example 1 is impregnated with a dilute aqueous arsenic acid solution so that the catalyst finally contains 1.5% by weight of $AsO_4H_3$ acid.

It is found that the catalyst, when tested for isoprene production in the same working conditions as in the tests of the foregoing table, gives a 63% conversion of dimethylmetadioxane into isoprene with a selectivity such that only 9 mol of isobutylene are produced per 100 mol of isoprene formed.

We claim:

1. Process for manufacturing boron-phosphate-based catalysts having a controlled acid content comprising preparation of boron phosphate by the action of boric acid on phosphoric acid, placing the resulting boron phosphate product in contact with a predetermined controlled quantity of an acid impregnating into said boron phosphate product said predetermined quantity of acid within the range of about .05 to 0.5 milliequivalent of acid per gram of boron phosphate, and drying of the final product.

2. Process for manufacturing boron-phosphate-based catalysts having a controlled acid content, comprising preparation of boron phosphate by the action of boric acid on phosphoric acid, placing the resulting boron phosphate product in contact with a predetermined controlled quantity of an acid, impregnating into said boron phosphate product said predetermined quantity of acid, within the range of about .05 to 0.5 milliequivalent of acid per gram of boron phosphate and drying of the final product to a temperature of about 400° C. or less.

3. Process as set forth in claim 1 wherein acidification is performed by means of a solution of an acid with low volatility.

4. Process as set forth in claim 1 wherein acidification is performed by means of a solution of acid with no volatility.

5. A process as described in claim 2 in which the final product is dried at a temperature of about 200° C. or less.

6. A process as described in claim 1 wherein the predetermined controlled quantity of acid is a solution of one of the acids of the phosphoric series.

7. A process as described in claim 1 wherein the predetermined controlled quantity of acid is a solution of orthophosphoric acid.

8. In a process for the manufacture of boron-phosphate-based catalysts having a controlled acid content, the steps which comprise reacting boric acid with phosphoric acid to produce a boron phosphate product, placing the resulting boron phosphate product in contact with a predetermined controlled quantity of an acid in aqueous solution, impregnating into said boron phosphate product said predetermined quantity of acid within the range of about .05 to 0.5 milliequivalent of acid per gram of boron phosphate, and drying the final product.

9. In a process for the production of boron-phosphate-based catalysts having a controlled acid content, the steps which comprise reacting boric acid with phosphoric acid to produce a boron phosphate product, placing the resulting boron phosphate product in contact with a predetermined controlled quality of an acid in a volatile solvent solution, impregnating into said boron phosphate product said predetermined quantity of acid within the range of about .05 to 0.5 milliequivalent of acid per gram of boron phosphate, and drying the final product.

10. A process as described in claim 9 in which said volatile solvent is ethyl ether.

11. A process as described in claim 1 in which said predetermined controlled quantity of acid is selected from the group consisting of sulphuric acid, sulphonic acid, and arsenic acid.

12. A process as described in claim 1 in which the resulting boron phosphate product obtained by the reaction of boric acid and phosphoric acid is first calcined before being placed in contact with said predetermined controlled quantity of acid.

13. The process as described in claim 12 in which said calcinated product is first reduced to pellet form in the shape and sizes required for filling catalyst vessels before being calcined.

14. The process as described in claim 12 in which the resulting boron phosphate product produced by the reaction of boric acid and phosphoric acid is first dried, crushed, homogenized, and extruded into the shapes and sizes required for filling catalyst vessels before being calcined.

15. In the process for the manufacture of isoprene by the catalytic decomposition of the dimethyl metadioxanes in the presence of a boron phosphate catalyst having a controlled acid content, the steps which comprise first preparing the boron phosphate catalyst by reacting boric acid with phosphoric acid, placing the resulting boron phosphate product in cotnact with a predetermined controlled quantity of an acid selected from the group consisting of sulphuric acid, sulphonic acid and arsenic acid, impregnating said boron phosphate product with said predetermined quantity of acid within the range of about .05 to 0.5 milliequivalent of acid per gram of boron phosphate, drying the resulting boron phosphate product having the predetermined quantity of acid contained therein, and decomposing said dimethylmetadioxanes in a catalytic furnace in the presence of said boron phosphate catalyst and water.

16. A process as described in claim 15 in which said predetermined quantity of acid is in the amount of about .10 to .25 milliequivalent of acid per gram of boron phosphate.

17. A boron phosphate catalyst product having a predetermined controlled acidity as obtained by the process of claim 1.

References Cited by the Examiner

UNITED STATES PATENTS

| | | | |
|---|---|---|---|
| 3,057,923 | 10/1962 | Hellin et al. | 260—681 X |
| 3,142,712 | 7/1964 | Valet et al. | 260—681 |

DELBERT E. GANTZ, *Primary Examiner.*

G. E. SCHMITKONS, *Assistant Examiner.*